Sept. 5, 1950 P. F. ELARDE 2,520,918

EJECTING AND CODING MEANS FOR RECORDING DEVICES

Filed Oct. 24, 1945 4 Sheets-Sheet 1

Inventor
P. F. Elarde

By Ralph L Chappell

Attorney

Sept. 5, 1950 P. F. ELARDE 2,520,918

EJECTING AND CODING MEANS FOR RECORDING DEVICES

Filed Oct. 24, 1945 4 Sheets-Sheet 2

Inventor
P. F. Elarde

By Ralph L. Chappell

Attorney

Sept. 5, 1950 P. F. ELARDE 2,520,918

EJECTING AND CODING MEANS FOR RECORDING DEVICES

Filed Oct. 24, 1945 4 Sheets-Sheet 3

Inventor

P. F. Elarde

By Ralph L Chappell

Attorney

EJECTING AND CODING MEANS FOR RECORDING DEVICES

Filed Oct. 24, 1945 4 Sheets-Sheet 4

Inventor
P. F. Elarde

By Ralph L. Chappell

Attorney

Patented Sept. 5, 1950 2,520,918

UNITED STATES PATENT OFFICE 2,520,918

EJECTING AND CODING MEANS FOR RECORDING DEVICES

Paul F. Elarde, Westchester, Ill.

Application October 24, 1945, Serial No. 624,282

2 Claims. (Cl. 346—145)

(Granted under the act of March 3, 1883, as amended April 30, 1928; 370 O. G. 757)

This invention relates to improvements in recording devices wherein a pen is caused to trace a record of a changing physical condition detected or measured by an electroresponsive element suitable for the purpose. More specifically, the invention relates to a recording device in which the take-up reel usually employed with the record paper is not required and in which means are provided for detaching a length of the record paper without interrupting the recording operation of the device.

Prior recording devices of this general type employ a take-up reel which accumulates the record paper, tape, chart or film, as desired, after a trace is recorded thereon. In such devices the take-up reel is driven at such a rate as to keep the record paper taut and thereby to maintain the paper within a predetermined path and in continuous contact with the pen. In devices of this character removal of any portion of the record necessitates interrupting the recording operation since loss of tension in the paper caused by disconnection of the paper from the take-up reel permits the paper to fall away from the pan or to deviate from the predetermined path of travel.

An object of the invention is to provide means for facilitating ready removal of sections of the record paper from the recording device as soon as the desired portion of the record is completed without interrupting the recording operation.

A further object of the invention is to provide a simple, efficient, economical and readily assemblable mechanism for accomplishing the desired result.

Further objects of the invention are to provide apparatus which may be readily attached to recording devices employing supply and take-up reels, whereby a portion of the record paper will be held in tension during the recording of the record trace; to provide means for assuring positive ejection of the record from the device and to provide means for preventing clogging of the recording paper channel during recording and ejection of the paper.

Other objects of the invention will be apparent from the drawings and following description. For a fuller understanding of the subject matter and objects of the invention reference should be had to the following detailed description taken in connection with the accompanying drawings, of which:

Figure 1:
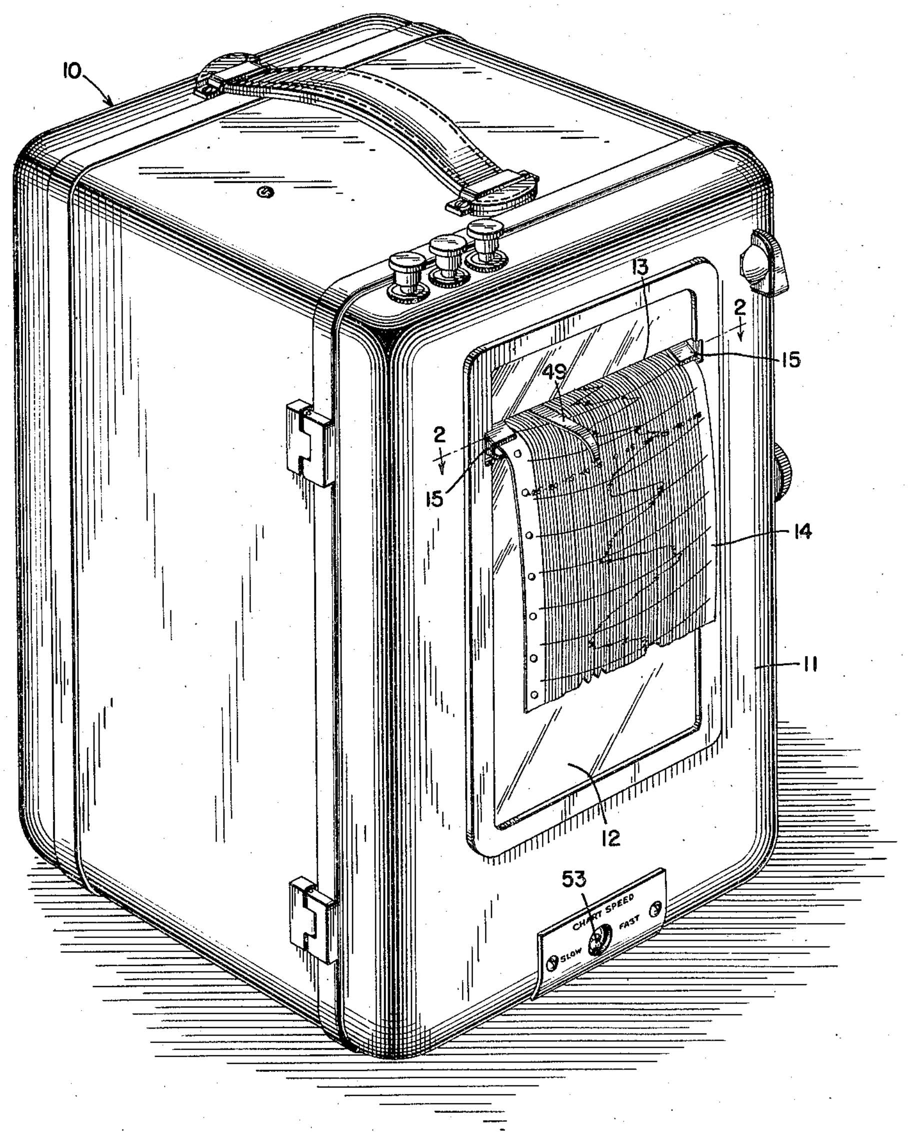
Fig. 1 is a view in perspective of the device according to a preferred embodiment thereof.

Referring to the drawings on which like numerals of reference are employed to designate like parts throughout the several views, and more particularly to Fig. 1 thereof, there is shown thereon a housing indicated generally by the numeral 10 of the recording device employing the present invention, having a hinged door 11 covering the front portion of the recorder and having an observing window 12 composed preferably of transparent material suitable for the purpose such, for example, as glass or a plastic and having an aperture 13 therein through which the ejection of the record paper 14 is facilitated by means of record guides 15. Near the lower edge of the door 11 is provided a speed control lever 53 for the purpose of selecting either of two predetermined paper or chart speeds. The record guides 15 are attached to the frame of the recording mechanism and protrude through the aperture 13 of the door 11 as more fully shown in Fig. 3.

Figures 2, 5:
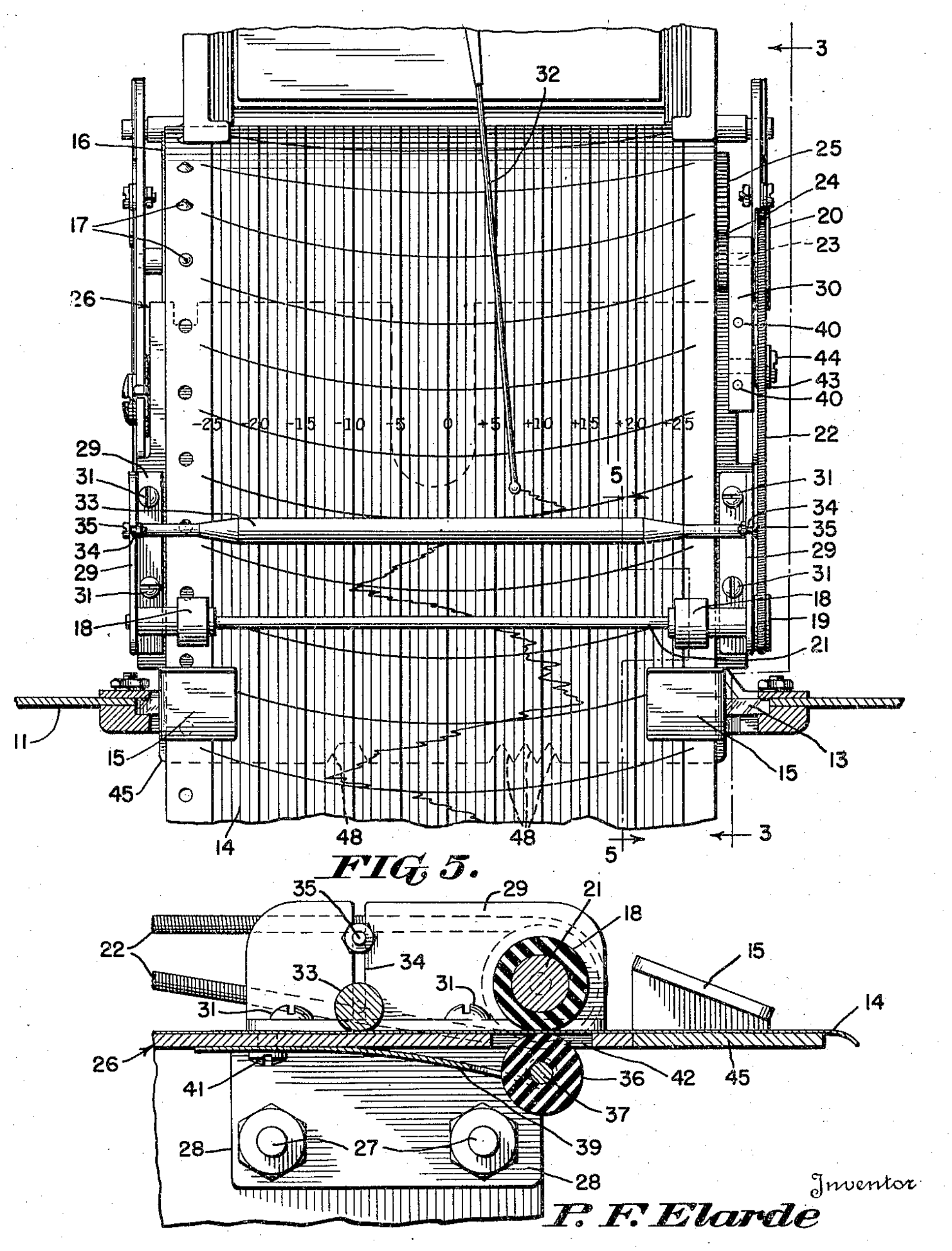
Fig. 2 is an enlarged view of the mechanism taken substantially along the line 2—2 of Fig. 1.
Fig. 5 is a view taken along the line 5—5 of Fig. 2.
Figure 3:
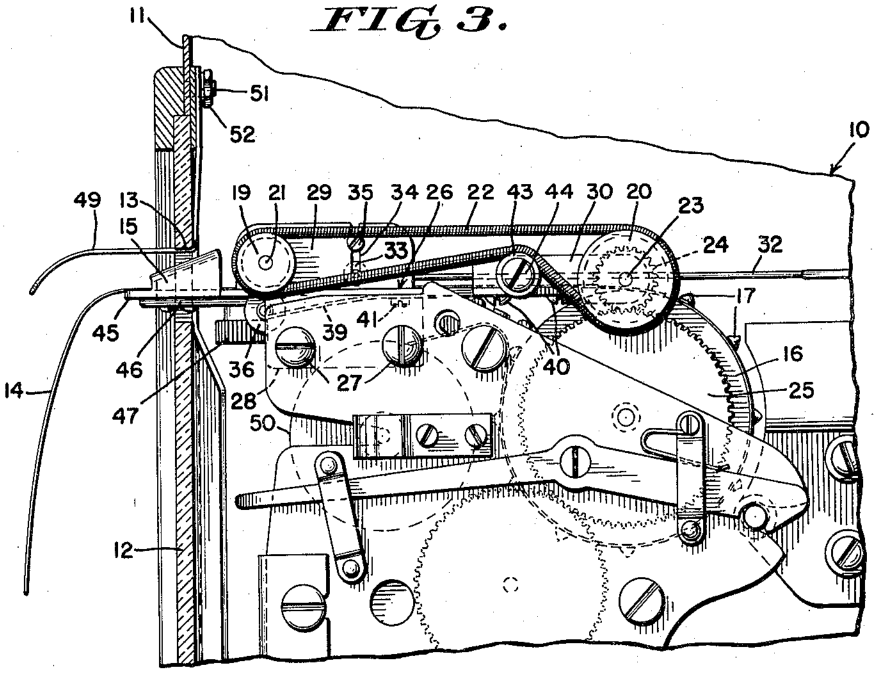
Fig. 3 is a sectional view partly broken away taken along the line 3—3 of Fig. 2.

In Figs. 2 and 3 is shown a record paper 14 passing over the feed roller 16 having sprockets 17 engaging perforations in the paper 14, which is held taut by the rollers 18 having a surface composed of material possessing the characteristic of high coefficient of friction such, for example, as rubber or any of the synthetic varieties thereof, and driven by means of pulley 19, shaft 21, spring belt 22, shaft 23, the pulley 20 and the gear 24, which is in meshing relation with the gear 25 attached to the feed roller 16. The feed roller 16 is driven by any suitable means, not shown, for example, an electrically operated or spring driven motor connected through a gear train to the gear 25.

Figure 4:
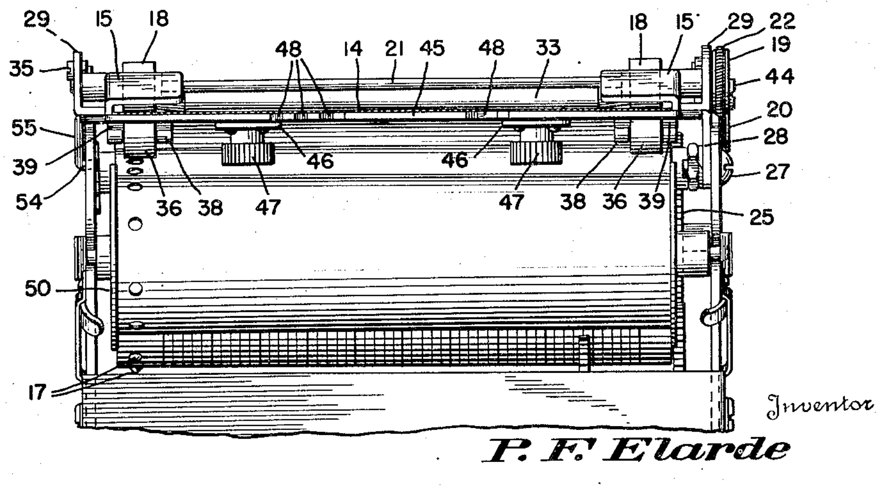
Fig. 4 is a fragmentary front elevational view of the device of Fig. 3.
Figures 6, 7:
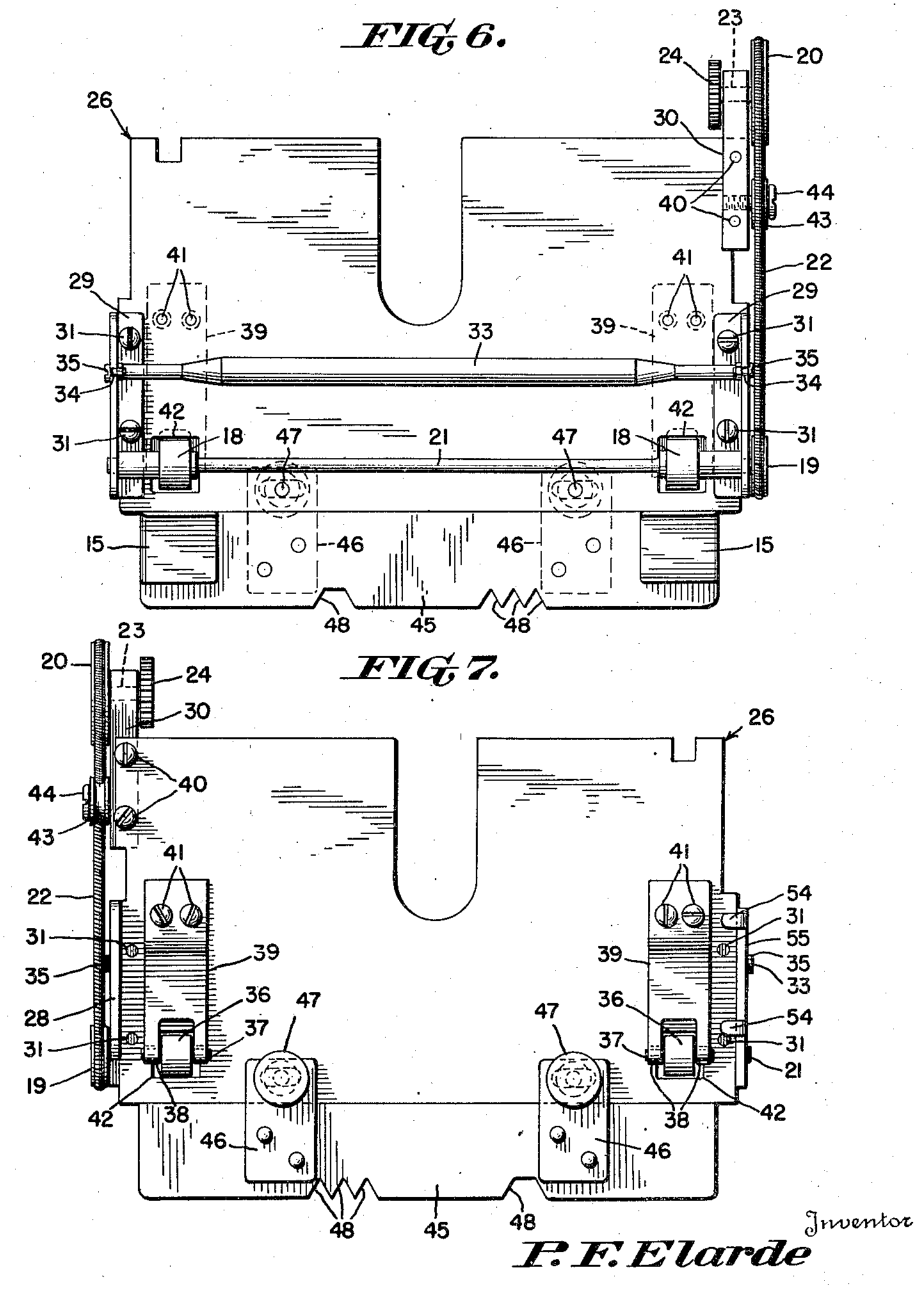
Fig. 6 is a top plan view of the device disassociated from the recording mechanism; and, Fig. 7 is a bottom plan view of the device of Fig. 6.

In Figs. 6 and 7 the numeral 26 generally designates a base plate or recording table which supports the record paper under the full width thereof and throughout the area of recording. On one side of the base plate is a downwardly turned portion or projecting ear 28 as shown in Fig. 5, provided with mounting holes by which the base plate is secured to the recorder frame as by bolts or screws 27, also shown in Figs. 3 and 4. And at the other side of base plate 26 is another downwardly turned portion or flange 55 which is provided with inwardly turned tabs 54 which are shown inserted in appropriately spaced mounting holes in the frame of the recorder. Tabs 54 are conveniently thus inserted prior to securing the ears 28 to the frame by means of screws 27. The recording table is thus rigidly attached to the recording frame and notations may be inscribed on the record at the time of recording.

Shaft 21 which supports pulley 19 and a pair of rollers 18 is mounted on base plate 26 by means of a pair of brackets 29 and screws 31. Pulley 20 is secured to shaft 23 which in turn is mounted on base plate 26 by means of the support 30 and the screws 40.

The base plate 26 is adapted to support uniformly that portion of the record paper which is within the recording area such that in any recording position thereof, pen 32, is supported by the record paper and the record paper is supported by the base plate, and the record is flattened against the supporting base plate in the vicinity of the pen by means of the weighted roller 33. Roller 33 is loosely held in a pair of vertical slots 34 of the brackets 29, and retained therein by the stops 35, in a manner adapted to permit the weight of the roller to flatten the paper against the table 26.

The paper is supplied from a supply roll in any suitable manner, such as the supply roll 50 shown in Fig. 3, and is caused to feed at a rate controlled by the speed of rotation of the feed roller 16, which is driven by any desired means, such as the gear train aforesaid, at any predetermined speed whereby the paper is fed over the base plate 26 at a predetermined rate. The source of power employed for driving the record paper and the means for controlling the movement of the paper past the table 26 form no part of the present invention.

In recorders of this character the rate at which the record paper passes the point of recording, and therefore the linear separation on the record paper of pen deflections corresponding to impulses of a given time separation, is controlled by a record feed roller having a predetermined or adjustable speed of rotation. This record feed roller is driven by a spring or electrical motor in any convenient manner such as through the gear train indicated in the drawings. The record feed roller is provided with sprockets at equal circumferential spacings near one end thereof, and the record paper is provided with perforations at equal spacings along an edge thereof which are engaged by the sprockets of the record feed roller in such a manner that the rate of travel of the paper is controlled by the peripheral speed of the record feed roller.

As the paper passes beyond the feed roller 16, in the present invention, it is caused to pass over the recording table 26. The recording pen thus bears against a flat paper surface uniformly supported by the table. The table is provided with channels formed by the brackets 29 at either edge thereof and is further held flat on the table by the weighted roller 33. As the paper moves beneath the weighted roller 33 and the friction rollers 18 it passes above the resilient rollers 36 and is gripped between rollers 18 and 36 by the pressure of a pair of springs 39, each of the springs being secured by screws 41 at one end thereof to the lower side of the base plate 26, the remaining end of each spring being formed into a bearing 38. Rollers 36 are mounted on pins 37 which are rotatably disposed in the bearing 38 of the springs 39 so as to bear against rollers 18 through the slots 42 in the base plate 26. The rollers 36 thus press the paper firmly against the rollers 18 in order that tension may be applied to that portion of the record paper between the feed roller 16 and the rollers 18 and 36. Since the pulley 19 is of smaller circumference than the driving pulley 20 and the spring belt 22 passes over pulleys 19 and 20, the pulley 19 is initially driven, as the pulleys revolve, at a higher peripheral speed than the pulley 20 in inverse proportion to their circumferences until the record paper becomes taut and thereafter prevents 19 from turning more rapidly than 20. The spring driving belt 22 is adapted to slip when the tension is thus increased to a predetermined amount. By this means tension on the paper is maintained at all times while the recording device is in operation. The tension of the spring belt 22 is adjusted and its engagement with the pulleys 19 and 20 made more positive by the idler roller 43 which is rotatably secured by means of the screw 44 to the support 30.

The present invention provides a pair of record guides 15 adapted to receive the record paper as it emerges from the rollers 18 and 36 and to guide the record paper through aperture 13 of the window 12 and over the outer edge of a shear plate 45 which is secured to base plate 26. A short curved guide member 49 passes through the aperture 13 and is secured to the housing 10 by bolt 51 and nut 52. The curved guide member 49 is adapted to guide the paper downwardly as it emerges from the aperture 13 in order that upward curling of the paper may be avoided, and thus the record is plainly visible at all times.

A shear plate or bar 45 is adjustably secured to the base plate 26 by means of the slotted tabs 46 and the knurled screws 47. When a section of record has been completed and it is desired to remove the same from the recorder, this may be done by tearing it across the shear bar 45 by pulling it downwardly and slightly to one side. Since the record paper is confined within the record channel by the brackets, the paper guides and the weighted roller and is supported by the table the record may be thus removed without interruption to the recording operation and the recorder is therefore not dependent on the operation of the take-up reel. The end of the record thus torn conforms to the shape of the outer edge of the shear bar 45. Notches 48 are provided in order that the paper when torn in this manner from the recorder will be torn along a line conforming to the notched bar 45, and thus have at the torn edge notches conforming to any suitable sequence or coding representative of a particular recorder. Since each recorder can be given a distinctive sequence of notches, every record removed from such a recorder bears a permanent marking by which it is identifiable with the recorder from which the record was taken. Thus identification of recorders is not dependent upon the ability of the operator to label each portion of the record as it is removed from the recorder, or upon his memory when it is necessary to remove a large number of such records from a number of recorders operating simultaneously when insufficient time is available to label any record until after all have been removed.

In recording devices of this general character a fresh supply of paper may be attached to the end of a nearly exhausted supply before it passes the feed roller and in the present invention the recording operation may be continued indefinitely without stopping since means is provided for maintaining paper tension, for confining the paper within a predetermined path and for ejecting an unlimited amount of recording paper. When a portion of the record is removed by tearing at the shear plate 45 any tendency of the record thereafter ejected through the aperture 13 to curl, and thereby obscure the record from view, is prevented by the curved member 49 which guides and directs the record downward for a sufficient distance to permit inspection of a portion of the record immediately after ejection from the recorder.

From the foregoing it may be seen that the operation of the device according to the present invention is as follows:

The record paper is caused to feed in any conventional manner from a supply roll over a record feed roll of conventional design and controlled speed, such as 16, and is then caused to feed under tension over the base plate 26, under the weighted roller 33, between the brackets 29, between the rollers 18 and 36 through the record guides 15, the aperture 13 and window 12, beneath the curved member 49 and thence downward into any suitable receptacle. As a portion of the record is desired for study it is readily removed by tearing across the distinctively notched edge of shear plate 45 which, by means of the notches produced at the ends of each such section of record removed, provides a permanent code indication identifiable with the recorder from which it was taken or, for example, with the location of the recording station.

While the invention has been described with reference to a particular example which gives satisfactory results, it will be apparent to those skilled in the art to which the invention pertains, after understanding the invention, that various changes and modifications may be made without departing from the spirit and scope of the invention and it is intended, therefore, in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a tape signal recorder of the character disclosed for identifying the tape removed therefrom, the combination of a housing, a reel of recording tape rotatably supported within the housing, a table arranged within the housing to support a reeled out portion of the recording tape, a recording pen arranged to engage said reeled out tape portion, means including a motor driven sprocket supported on the housing for feeding said tape over the table, said table having a pair of apertures arranged respectively adjacent the forward side edge portions thereof, tape tensioning means driven by said sprocket means including a plurality of mutually coacting friction rollers arranged on opposite sides of the table to grip said tape therebetween through said apertures, a tape tear off bar secured to the forward edge of said table as an extension thereof and including a coded knife edge so that a length of tape may be severed thereacross and concurrently therewith coded by said edge, and a weighted roller interposed between said feed roll and said friction rollers and arranged adjacent the tape engaging portion of said recording pen for holding the tape against the surface of the table whereby data characteristic of the signal and source thereof may accurately be recorded by the pen and readily written manually on the tape opposite the signal recordations as each of the signals is recorded.

2. In a tape recorder of the character disclosed for identifying the tape removed therefrom, the combination of a housing, a reel of recording tape rotatably supported within the housing, a table arranged within the housing to support a reeled out portion of the recording tape, said table having a pair of apertures disposed therein, each of said apertures being arranged adjacent a forward edge portion of an opposite side of said table, a recording pen arranged to engage said reeled out tape portion, means including a motor driven sprocket supported on the housing for feeding said tape over the table, a plurality of friction rollers driven by said sprocket means for tensioning said tape, a plurality of brackets mounted on the top of said table and adjacent the forward edge portion thereof, said brackets having vertically arranged slots therein, means for rotatably supporting said friction rollers between said brackets, a plurality of springs attached to the bottom of said table and adjacent the forward edge portion thereof, a plurality of idler rollers supported on said springs and urged thereby through said apertures into engagement with said friction rollers, a tape tear off bar secured to the forward edge of said table as an extension thereof and including therein a coded knife edge so that a length of tape may be severed thereacross and concurrently therewith coded by said edge, and a weighted roller guided by said slots in said brackets and interposed between said feed roll and said friction rollers and adjacent the tape engaging portion of said recording pen for holding the tape against the surface of the table whereby data characteristic of the signal and of the source thereof may accurately be recorded by the pen and readily written manually on the tape opposite the signal recordations as each of the signals is recorded.

PAUL F. ELARDE.

REFERENCES CITED

The following references are of record in the file of this patent:

UNITED STATES PATENTS

| Number | Name | Date |
|---|---|---|
| 827,798 | Graham | Aug. 7, 1906 |
| 1,219,858 | Patterson | Mar. 20, 1917 |
| 1,564,634 | Side | Dec. 8, 1925 |
| 1,886,844 | Spitzglass | Nov. 8, 1932 |
| 2,169,230 | De Martile | Aug. 15, 1939 |
| 2,199,672 | Peterson | May 7, 1940 |
| 2,398,352 | Beach et al. | Apr. 16, 1946 |